United States Patent [19]
Gouenard et al.

[11] Patent Number: 5,815,111
[45] Date of Patent: Sep. 29, 1998

[54] METHOD OF REDUCING AMBIGUITIES IN SYNTHETIC APERTURE RADAR, AND RADAR IMPLEMENTING THE METHOD

[75] Inventors: Sophie Gouenard, Toulouse; Noël Suinot, Escalquens, both of France

[73] Assignee: Alcatel Espace, Nanterre Cedex, France

[21] Appl. No.: 664,174

[22] Filed: Jun. 14, 1996

[30] Foreign Application Priority Data

Jun. 15, 1995 [FR] France .................................. 95 07147

[51] Int. Cl.⁶ .................................................. G01S 13/00
[52] U.S. Cl. ............................................. 342/25; 342/132
[58] Field of Search ....................................... 342/25, 132

[56] References Cited

U.S. PATENT DOCUMENTS

| 3,363,248 | 1/1968 | Nicodemus | 342/132 |
| 4,096,478 | 6/1978 | Chavez | 343/7.7 |
| 4,309,703 | 1/1982 | Blahut | 375/23 |
| 4,724,418 | 2/1988 | Weindling | 342/25 |
| 4,847,624 | 7/1989 | Hopwood et al. | 342/201 |
| 4,960,329 | 10/1990 | Schofield | 356/5 |
| 5,051,749 | 9/1991 | Stoyle | 342/25 |

FOREIGN PATENT DOCUMENTS

4235071A1  4/1994  Germany .
2208933  4/1989  United Kingdom .

Primary Examiner—J. Woodrow Eldred
Attorney, Agent, or Firm—Sughrue, Mion, Zinn, Macpeak & Seas, PLLC

[57] ABSTRACT

A method of defocusing range ambiguities in a pulse radar, in particular of the SAR type, the method comprising the following steps:

radar pulses are spread on transmission by using a plurality of "chirp" rules for varying the frequency of the transmitted wave as a function of time;

during transmission of successive pulses, chirp rules are alternated between chirps that rise and chirps that fall in the frequency/time plane of the pulse;

received echoes are compressed by matched filtering using a correlation operation between the received echo signal and the chirp rule that was applied at the time of transmission of the pulse that gave rise to said echo signal;

said method being characterized in that said plurality of rules for varying the frequency of the transmitted wave as a function of time comprise a number M of said rules, with M being an integer greater than or equal to 3.

16 Claims, 7 Drawing Sheets

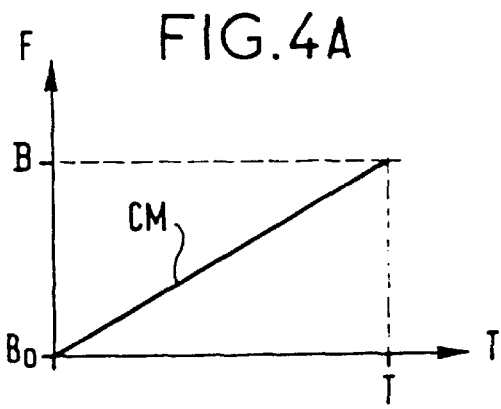
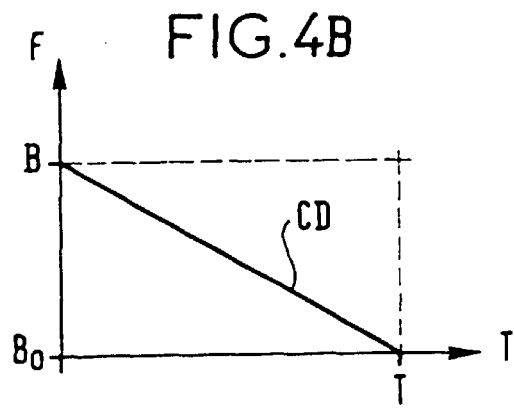
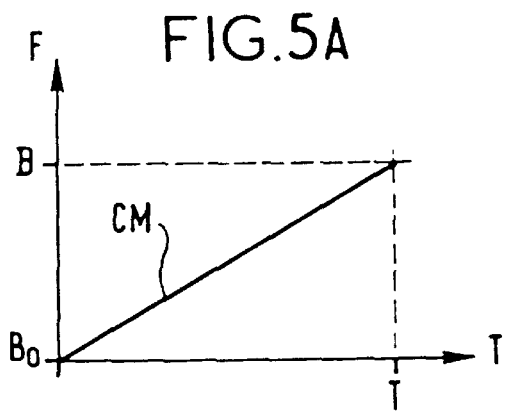
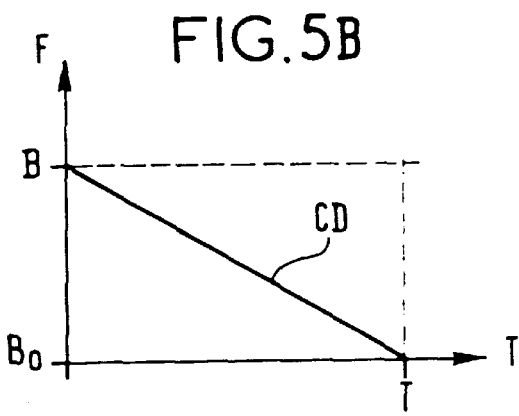
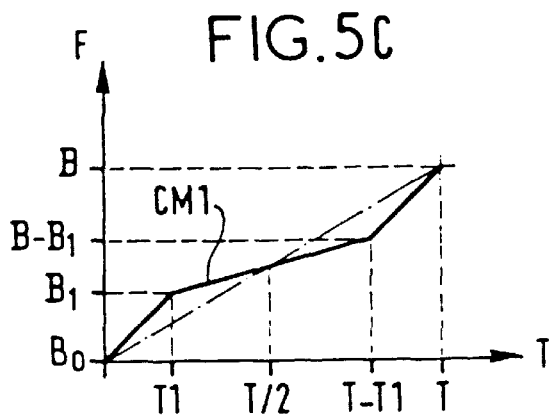
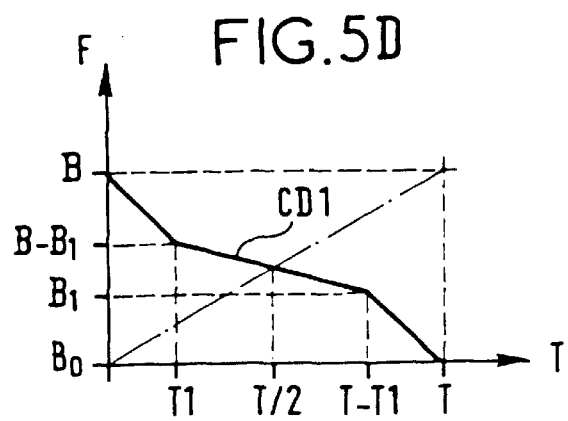

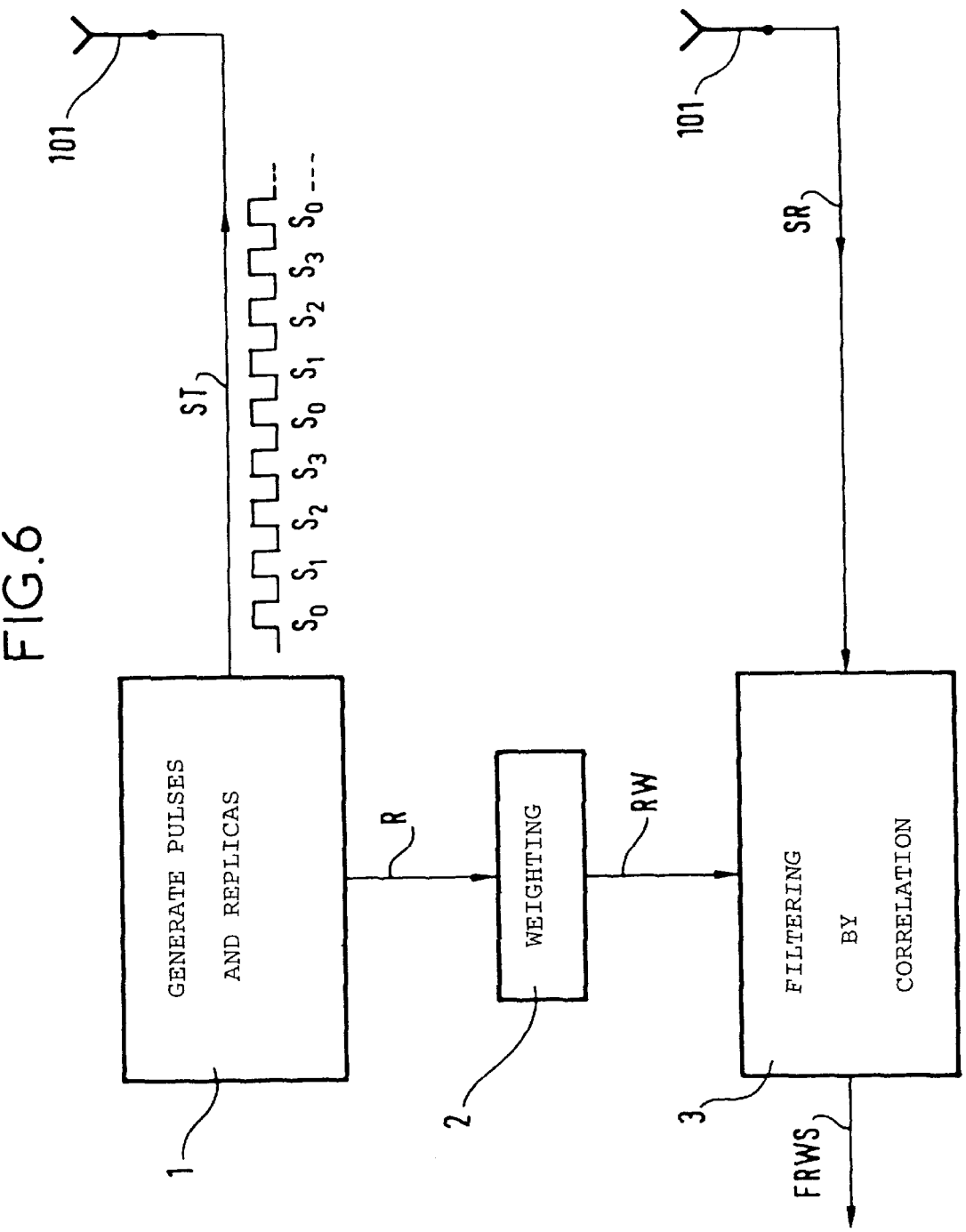

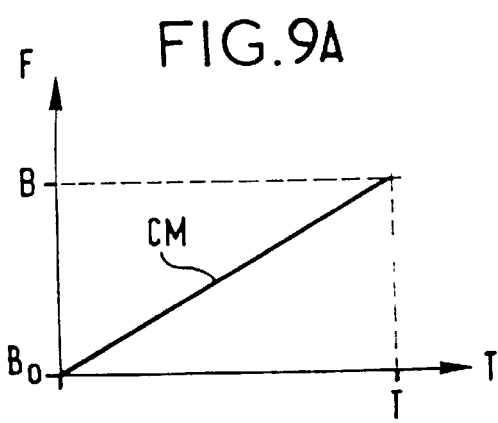
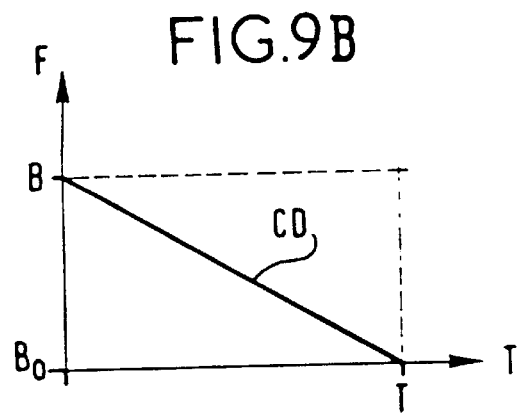
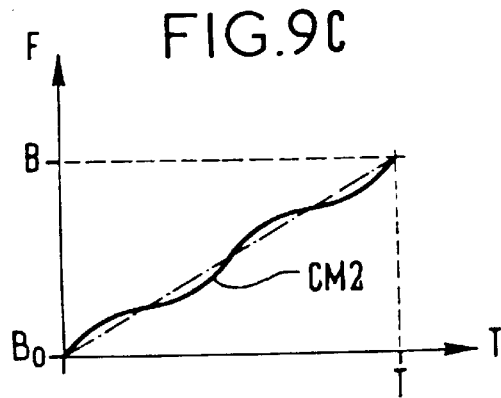
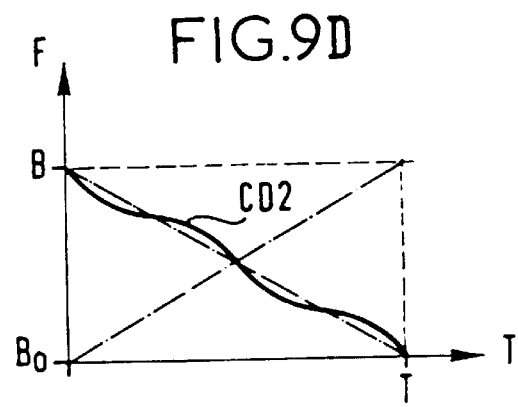
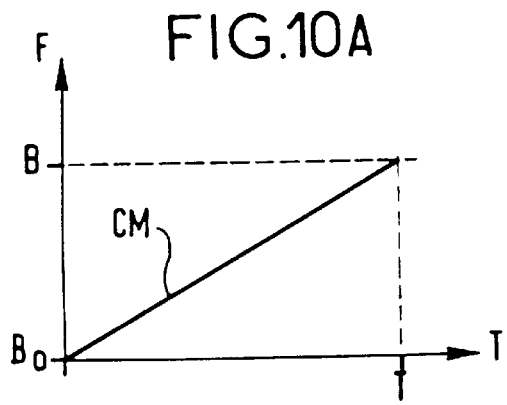
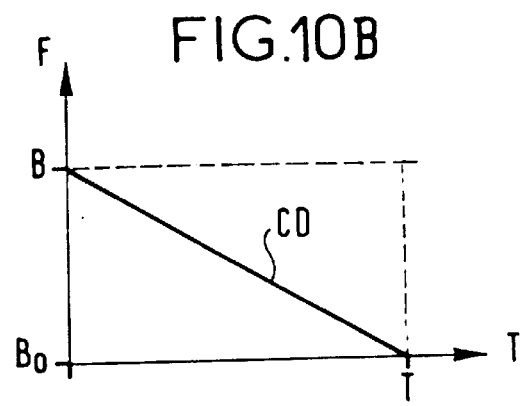
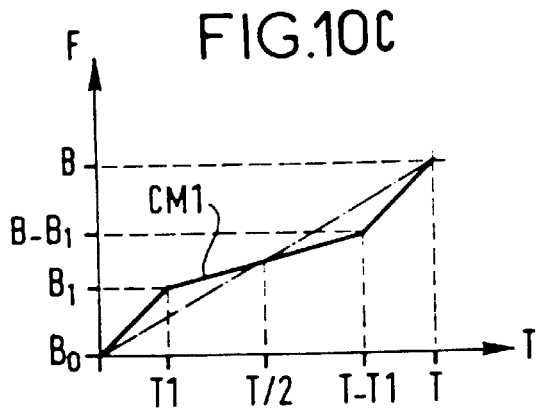
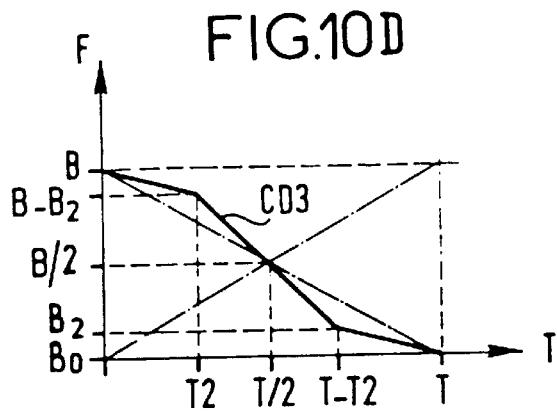

METHOD OF REDUCING AMBIGUITIES IN SYNTHETIC APERTURE RADAR, AND RADAR IMPLEMENTING THE METHOD

BACKGROUND OF THE INVENTION

The field of the invention is that of synthetic aperture radar (known to the person skilled in the art by the acronym SAR), and more particularly the field of terrestrial observation by satellite. The invention is advantageously used in space radar missions from an artificial satellite in orbit about a celestial body. It may also be applied on board aircraft or other vehicles such as missiles, helicopters, or drones, . . . that move close to the ground or any other celestial body (planet, asteroid, comet, interstellar clouds, etc. . . .).

In particular, the invention is advantageously used for performing high resolution observations with a high coefficient of backscatter, of radar reflectivity from the ground. The invention makes it possible to reduce or even eliminate ambiguities due to receiving echoes coming from radar pulses that are earlier or later than the pulse currently being received and processed in normal operation.

SUMMARY OF THE INVENTION

Satellites in low orbit are given microwave remote detection missions making use of microwave radar. The satellite travelling in low orbit moves relative to a fixed point on the terrestrial surface, unlike a geostationary satellite.

This movement makes it possible for the observation satellite to overfly the ground in a direction that is determined by its orbit. Radar measurements are performed at successive moments by transmitting short pulses of electromagnetic energy at a pulse repetition frequency (known to the person skilled in the art by the acronym PRF), with each pulse being also characterized by spectrum qualities and by the way in which they vary during the pulse.

In the intervals between pulses being transmitted, the radar equipment receives radar echoes coming from the ground or from any other reflecting object illuminated by the preceding pulses. The signal received in this way is then processed and analyzed to extract the information contained therein, such as distance travelled (by round-trip time), relative reflectivity of the object, . . ..

Radar measurements performed in this way at successive moments all along the path of the satellite make it possible to draw up maps of the measured parameters as a function of the position of the satellite, (or of any other vehicle serving as a platform for the radar).

A radar remote detection satellite of the prior art is shown diagrammatically in FIG. 1.

In FIG. 1, a satellite 100 is overflying the earth at an altitude H of several hundred kilometers, at a velocity $\overline{V}_{sat}$ which depends on the geometrical parameters of the orbit. The satellite is provided with the equipment required for its mission, such as a solar panel 110 and a radar antenna 101. In the simplest configuration, a radar remote detection satellite illuminates in a "transverse" illumination plane that contains the nadir and that extends perpendicularly to the velocity $\overline{V}_{sat}$, and as it moves, the satellite thus illuminates a swath F on the ground of width G.

By convention, measurements in a direction in a first plane that contains the nadir and that extends perpendicularly to the velocity $\overline{V}_{sat}$ are said to be "in elevation"; while measurements in a direction in a second plane perpendicular to said first plane and possessing a vector component parallel to the velocity $\overline{V}_{sat}$ are said to be "in azimuth".

The swath F is illuminated by successive microwave pulses transmitted at the pulse repetition frequency (PRF) with the reflections therefrom constituting the radar signal which is received by the same antenna 101 operating in reception, and subsequently interpreted to extract the desired radiometric data. Processing said data by computation makes it possible to reconstruct a two-dimensional image of the ground area probed by the radar during the passage of the satellite.

To illuminate the swath F within an accessible zone Z, a beam B of angular divergence $\beta$ is radiated at an angle $\psi$ relative to the nadir.

As shown in FIG. 1, the intersection of the beam B with the ground has a width dimension F and a length dimension S, in the direction of the velocity $\overline{V}_{sat}$. The angle $\psi$ can take values lying in the range $\psi m$ to $\psi M$, and the beam B therefore remains within the accessible zone Z. As the satellite moves, $\psi$ remains constant for a given image when implementing a conventional SAR mode.

The beam B illuminates each point on the ground of the swath F by means of I pulses.

These pulses are used during synthetic aperture processing which is generally performed on the ground. Typical values of various parameters for remote detection missions presently in operation are, for example:

| H(km) | F(km) | $\phi m$ | S(km) | I | $\phi M$ |
|-------|-------|----------|-------|------|----------|
| 800   | 20    | 20°      | 4     | 1000 | 55°      |

Successive measurements are used in coherent manner in the computation, i.e. with a phase value for each measurement which is a function of time so as to take account of the displacement of the satellite between successive measurements.

Azimuth measurements include a Doppler component due to the velocity of the satellite in the same plane as the aiming direction of the radar. A radar having high resolution in azimuth performs filtering on the Doppler offset of the radar frequency so as to improve the coherence with which successive signals are summed.

In the elevation plane, as shown in FIG. 2, measurement of the range R at the elevation sighting angle is accompanied by dispersion $\Delta R$ due to the angular divergence $\beta$ in elevation of the beam B. Providing it is not too large, this dispersion can be averaged by processing the received signal data, it being understood that if $\Delta R$ is greater than the distance travelled by a pulse before the following pulse is transmitted, then ambiguity results in the distance measurement. This puts a limit on the maximum pulse repetition frequency (PRF) for a given geometrical configuration:

$$PRF < \frac{c}{2F\sin\phi M},$$

where c is the velocity of light.

In other words, for given azimuth resolution, PRF is determined, and likewise, from the above relationship and the altitude H of the orbit, the maximum width of the swath F is also determined.

The above description takes no account of side lobes of the beam B, with such side lobes necessarily existing for any antenna of finite dimensions. Side lobes give rise to ambiguities both in azimuth and in elevation (range), as shown diagrammatically in FIG. 3 for azimuth ambiguities.

FIG. 3 is an antenna radiation pattern (equally applicable to transmission and to reception) including a left side lobe NG1 and a right side lobe NG2 on either side of a main lobe G centered about a frequency $f_0$. On reception, only the signals of the main lobe G can be interpreted without ambiguity. The side lobes contain ambiguous signals NG1 and NG2 that are spaced apart by ±PRF about the main lobe G.

In practice, the PRF can be selected in such a manner that the ambiguous signal corresponding to reflection from the nadir reaches the radar during transmission since nadir reflection is by far the strongest ambiguous signal and it can be effectively eliminated by the above trick.

However, that constraint can make it necessary to skip through numerous different PRFs during an orbit, and at high incidence that solution is sometimes not possible. Also, at low incidence, the required increase in PRF can be significant, thereby giving rise to constraints on telemetry data rate.

In order to simplify the microwave amplification subsystem of the SAR system for producing images which contain spot targets or diffuse targets, the person skilled in the art is aware of the pulse compression technique which consists in varying transmission frequency during a pulse, in application of a frequency/time rule known as "chirp". The transmitter can then operate over a longer period of time without requiring excessive peak power.

When receiving echoes of spread signals, the received echo is correlated with the replica which corresponds to the transmitted signal that gave rise to the echo, but which is of conjugate phase and is offset in time to take account of the go-and-return travel time of the signal. It can thus be said, so to speak, that the inverse of the "chirp" rule is applied by computation so as to "compress" the received pulse. Any received signal which does not correspond to the chirp rule used for compression is defocused, and therefore does not contribute in coherent manner to the image. Compression is used both in azimuth and in range. However, the person skilled in the art performs such compression deliberately for range, whereas it occurs naturally for azimuth due to the satellite advancing in azimuth.

It is known to the person skilled in the art to alternate the chirp rule between two mutually symmetrical forms, a rising form CM and a falling form CD, as shown in FIGS. 4A and 4B that apply to the range axis. Such a system is described, for example in an article entitled "Range ambiguity suppression technique for the spaceborne synthetic aperture radar", by JHA, A. M.; ARCHANAY MAGNUDAR; and PILLAI, N. S.; published by the AIAA following the 39th Congress of the International Astronautical Federation, 1993.

When one of the two chirp rules is used for compressing a received signal, all odd-order ambiguities are mismatched during range processing since they have a rule for frequency variation as a function of time that is contrary to that of the non-ambiguous signal. As a result odd-order ambiguities are defocused and rejected from the coherent summing of successive pulses.

In contrast, even-order ambiguities have the same frequency/time characteristic as the chirp of the non-ambiguous signal, and they are therefore added coherently therewith, giving rise to a loss of image quality (loss of contrast, reduction in signal-to-noise ratio, loss of resolution, . . .).

Also, known methods do not enable ambiguities to be spread over the azimuth axis.

An object of the invention is to mitigate the drawbacks of the prior art, and to improve the performance that can be achieved with a synthetic aperture radar, but without thereby increasing the costs of implementing it.

To these ends, the invention provides a method of defocusing range ambiguities in a pulse radar, in particular of the SAR type, the method comprising the following steps:

radar pulses are spread on transmission by using a plurality of "chirp" rules for varying the frequency of the transmitted wave as a function of time;

during transmission of successive pulses, chirp rules are alternated, between chirps that rise and chirps that fall in the frequency/time plane of the pulse;

received echoes are compressed by matched filtering using a correlation operation between the received echo signal and the chirp rule that was applied at the time of transmission of the pulse that gave rise to said echo signal;

said method being characterized in that said plurality of rules for varying the frequency of the transmitted wave as a function of time comprise a number M of said rules, with M being an integer greater than or equal to 3. M may contain up waveforms and/or down waveforms.

In a variant, the invention provides a method having N rising chirp rules and N falling chirp rules, characterized in that for each rising chirp rule there exists a corresponding falling chirp rule, said corresponding pairs of rules being mutually symmetrical in shape in the frequency/time plane. In which case, M=2N, but it is always possible to make use only of a portion M' of the 2N waveforms, in which case ambiguities are attenuated only up to order (M'−1).

In another variant, the invention provides a method having two linear chirp rules, one rising and the other falling, characterized in that each of the remaining 2(N−1) chirp rules comprises a plurality of different slopes within the chirp, with connections between slopes that are continuous in frequency and phase.

According to another characteristic, the invention provides a method in which said plurality of slopes is not less than three, and in which said slopes oscillate about the slope of the corresponding linear chirp.

In another variant, the invention provides a method in which said plurality of slopes is smoothed by a polynomial or by any other differentiable curve.

According to another characteristic, the invention proposes a method in which any one of the above-described variants that spreads ambiguities over the range axis is characterized in that it further comprises the following steps for spreading ambiguities over the azimuth axis:

the initial phase of each pulse is encoded on transmission in application of a given sequence of initial phases for the transmission of successive pulses;

the same sequence of initial phases is applied for the replica; and said sequence of phases is injected into said matched filtering during compression of the received echoes. Since the phase sequence is exactly opposite between the received signal and the corresponding replica, distance compression is not disturbed by such encoding, unless the replica and the echo do not correspond (ambiguity). In which case, ambiguities are defocused on the azimuth axis.

According to another characteristic, the method of the invention further comprises the following steps:

the center frequency of each pulse is encoded on transmission in application of a given sequence of frequencies for transmission of successive pulses;

the same sequence of frequencies is applied for the replica; and said sequence of frequencies is injected into said matched filtering during said compression of the received echoes.

The invention also provides synthetic aperture radar implementing any of the methods of the invention or any variant thereof.

BRIEF DESCRIPTION OF THE DRAWING

Other characteristics and advantages of the invention appear on reading the following detailed description of various implementations of methods of the invention and the main variants thereof, with reference to the accompanying drawings given as non-limiting examples, and in which:

FIGS. 4A and 4B are mentioned above and show diagrammatically, in the frequency/time plane, the waveforms as transmitted in a prior art method suitable for diminishing odd-order ambiguities;

FIGS. 5A, 5B, 5C, and 5D are diagrams in the frequency/time plane showing an example of four waveforms transmitted successively in a method of the invention for defocusing ambiguities on the range axis;

FIG. 6 is a diagram and flow chart showing the main steps in one implementation of the method of the invention for defocusing ambiguities on the range axis;

FIGS. 9A, 9B, 9C, and 9D are diagrams in the frequency/time plane showing another variant of waveforms transmitted successively in alternation with the waveforms of FIGS. 4A and 4B, and applicable to another implementation of the method of the invention; and FIGS. 10A, 10B, 10C, and 10D are diagrams in the frequency/time plane showing another variant of waveforms that are transmitted successively in alternation with the waveforms of FIGS. 4A and 4B in another implementation of the method of the invention.

DETAILED DESCRIPTION OF THE PREFERRED EMBODIMENTS

Figure 1:
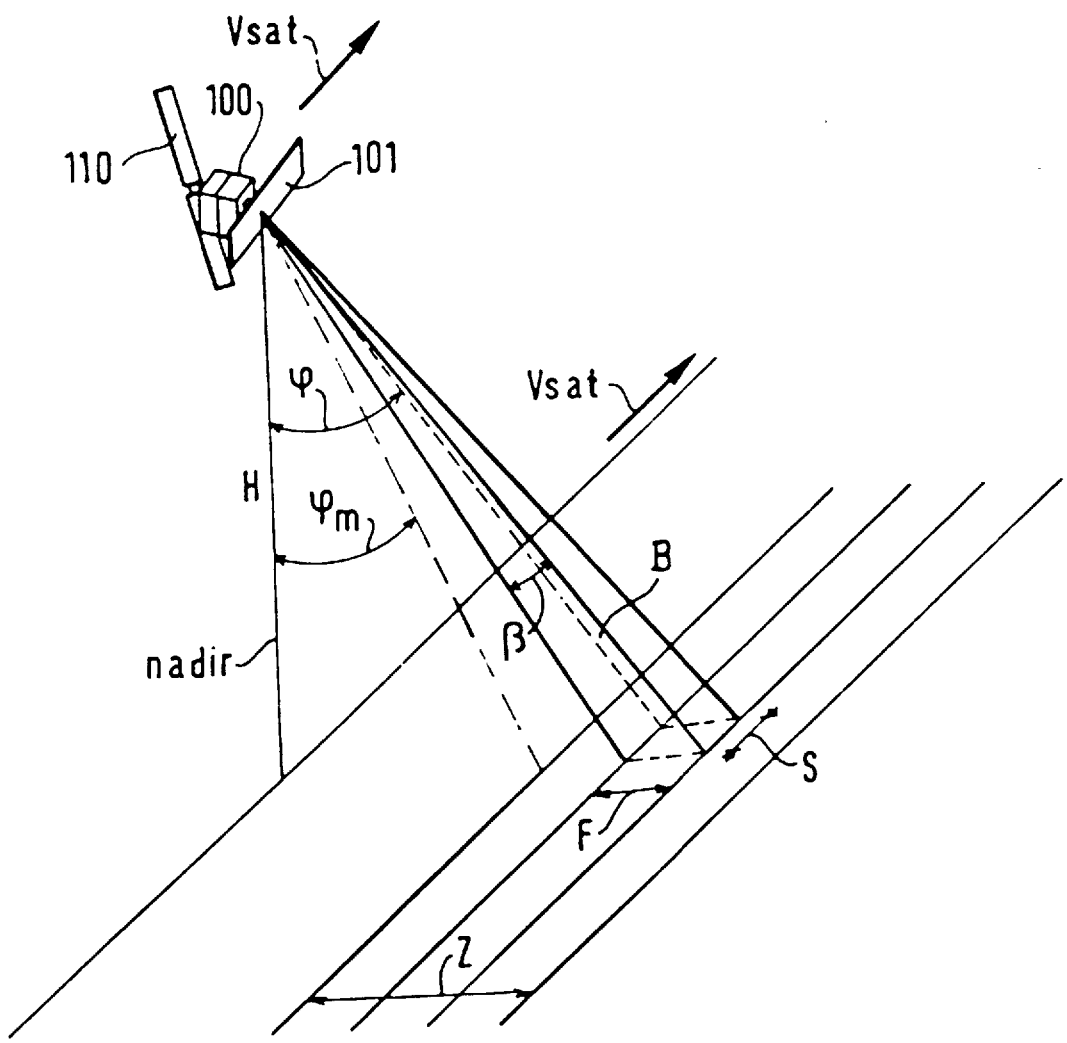
FIG. 1 is described above and shows diagrammatically a synthesis aperture radar known in the prior art and on board a moving satellite.
Figure 2:
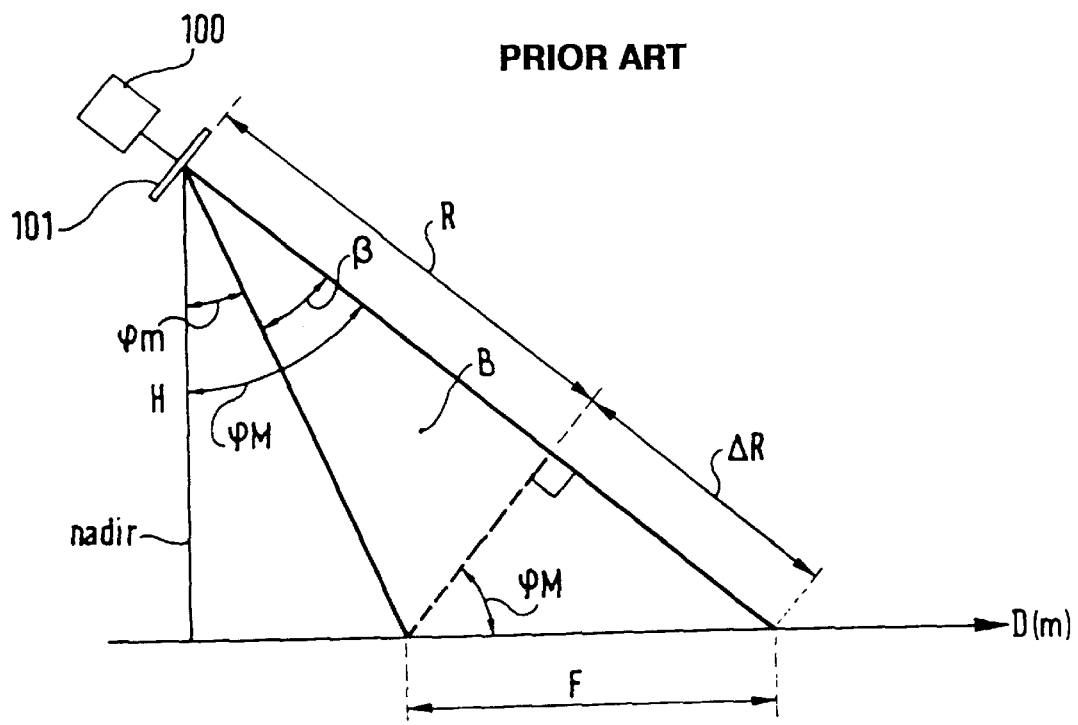
FIG. 2 is described above and is a diagrammatic elevation view of the range dispersion that results from the angular divergence of the radar beam.
Figure 3:
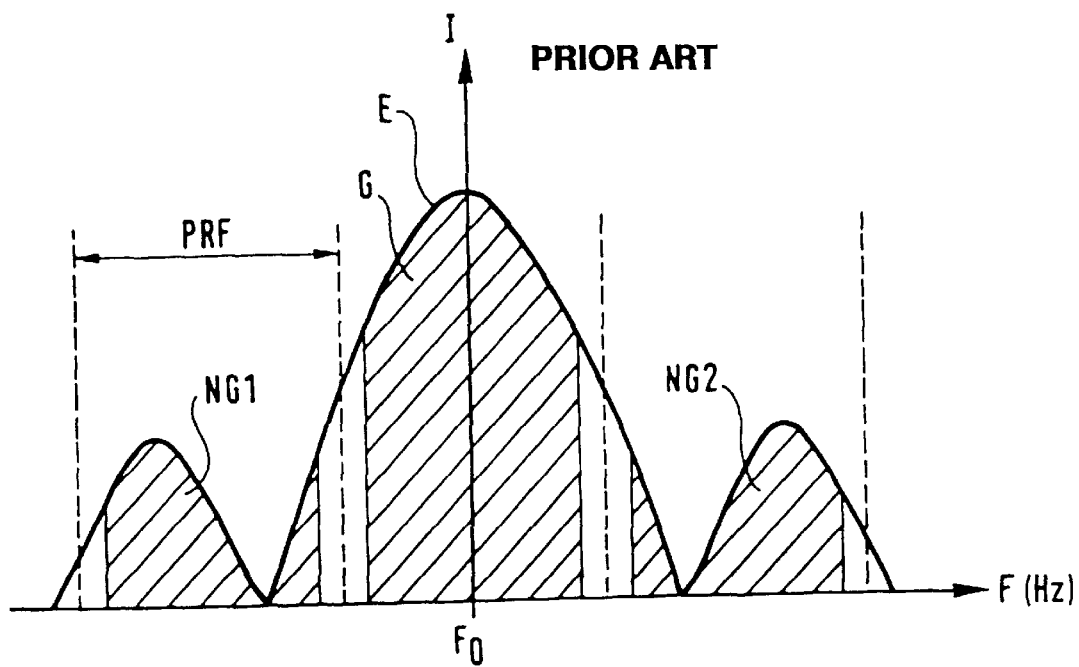
FIG. 3 is described above and shows diagrammatically how azimuth ambiguities originate from the side lobes of the radiation pattern of SAR.

In the figures, the same references designate the same elements. Physical dimensions are not always true to scale for reasons of clarity.

As already explained with reference to FIGS. 4A and 4B, the use of a linear rising chirp CM in alternation with a linear falling chirp CD makes it possible to defocus odd-order ambiguities on the range axis in application of a method known in the prior art.

In contrast, even-order ambiguities persist since all even pulses are identical with one another, regardless of which pulse they come from in the transmitted pulse train.

By using a plurality of rules for varying the frequency of the transmitted wave as a function of time, comprising an even number M of such rules, where M is an integer greater than 2, it is possible to defocus ambiguities of order P such that P≠M, for integer P.

FIGS. 5A, 5B, 5C, and 5D show a simple example of four waveforms transmitted as successive pulses in a method of the invention, suitable for spreading ambiguities of order 2+i2N on the range axis, for N=2.

As shown below with reference to FIG. 6, the transmitted pulse train comprises cyclic repetition of the four waveforms: namely the two waveforms known in the prior art and shown in FIGS. 4A and 4B, plus two new waveforms as shown in FIGS. 5C and 5D.

In this implementation of a method of the invention, the first waveform transmitted is as shown in FIG. 5A, which represents a linear rising chirp CM, starting from an arbitrary frequency $B_0$ at time t=0 and rising to a frequency B at a time t=T.

The second waveform in this implementation is shown in FIG. 5B which represents a linear falling chirp CD starting from a frequency B at time t=0, and terminating at an arbitrary frequency $B_0$ at time T.

The third waveform in this implementation is shown in FIG. 5C which represent a non-linear rising chirp CM1. This waveform has two breaks, and it presents non-linear variations in frequency as a function of time, e.g. frequency slopes that vary within a function that rises overall.

The following pulse (FIG. 5D) has a similar waveform that is falling, i.e. comprising a plurality of generally falling slopes in the frequency/time plane.

The waveform shown in FIGS. 5C and 5D comprises three segments of different slopes in the frequency/time plane, determined by parameters $B_1$ and $T_1$ which are respectively the bandwidth $B_1$ and the duration $T_1$ of the first and third segments. Parameters such as transmitted bandwidth, total pulse duration, and signal amplitude may, for example, be identical to those of the linear chirp. Phase is kept constant at the singularity points to avoid phase shifts that degrade impulse response.

Time weighting, e.g. Hamming weighting, may be applied as for the conventional chirp so as to improve the quality of the impulse response. As known to the person skilled in the art, Hamming weighting is a conventional form of weighting for SARs, and has the following form:

$$s(t) = a(t) \cdot \left[ 1 - (1 - \alpha)\cos\left(\frac{2\pi(t - t_0)}{T}\right) \right]$$

where:
T=signal period
$t_0$=time of origin
α=Hamming coefficient
(0.5<α<1)

The advantage of this waveform is that it is sufficiently similar to the linear chirp to retain proper impulse response parameters, while nevertheless having differences of slope that are necessary to ensure it does not match the linear chirp replica, so as to defocus any ambiguities coming from pulses having the linear chirp waveform.

In the implementation of FIGS. 5C and 5D, the chirps CM1 and CD1 are "broken" so as to have slope that varies about the linear slopes CM and CD of FIGS. 5A and 5B respectively. In the implementation shown in said FIGS. 5C and 5D, the chirps CM1 and CD1 are "broken" so as to exhibit three different slopes in the frequency/time characteristic of each transmitted pulse.

Like the conventional chirps shown in FIGS. 5A and 5B, the total frequency change is B over time T, however the chirps in the two pulses shown in FIGS. 5C and 5D are not linear.

In FIG. 5C, it can be seen that the slope or frequency change $B_1$ over period $T_1$ is greater than for the linear chirp.

Thereafter, in this implementation, the frequency slope between $T_1$ and $T-T_1$ is less than the slope of the linear chirp CM (FIG. 5A) causing the frequency to change from $B_1$ to $B-B_1$. To catch up, the slope is steeper again during the period $T-T_1$ to T, thereby raising the frequency of the chirp from $B-B_1$ to B. These slopes that differ from the slopes of the chirp CM cause ambiguous echoes to be poorly compressed.

In FIG. 5D, it can be seen that in this implementation the falling fourth chirp CD1 is broken in symmetrical manner (relative to FIG. 5C). In another example of waveforms suitable for implementing the invention (see FIGS. 10A to 10D), the falling chirp CD3 may be antisymmetrical to the rising chirp. Strictly speaking, the waveform of the falling chirp need not have any correlation with the waveform of the rising chirp, but such correlation is adopted in order to facilitate explaining the principles of the invention. A correlated waveform may also constitute a preferred implementation of the invention since if a given waveform satisfies requirements, then a symmetrical version thereof will do likewise, since the falling symmetrical waveform will behave relative to CD in the same manner as the rising waveform behaves relative to CM (correlation level attenuated by at least 10 dB).

The symmetrical waveform of FIG. 5D therefore falls from frequency B to $B-B_1$ during the first period $T_1$ with a steep slope, and then falls with a less steep slope between times $T_1$ and $T-T_1$, during which frequency falls from $B-B_1$ to $B_1$. Finally, the chirp terminates by falling from $B_1$ to an arbitrary frequency $B_0$.

The parameters selected for the set of data values (transmitted bandwidth, total pulse duration, weighting coefficient) are selected to optimize the compromise between quality of impulse response and reduction of ambiguities. By way of non-limiting example, we give various numerical values to illustrate the description of the chirp, without these values being considered as necessary nor even preferred in implementing the invention. The conventional parameters for a high resolution space SAR are the following:

distance compression gain: 1000
transmitted bandwidth: 100 MHz
pulse duration: 10 $\mu$s
weighting coefficient: 0.54.

With this set of parameters, a chirp having two breaks can be optimized as follows:
$B_1$=25 MHz
$T_1$=2.41 $\mu$s.

The following table gives the theoretical performance of a chirp having these characteristics together with those of a conventional linear chirp as shown in FIGS. 4A and 4B. Falling chirps (FIGS. 5B and 5D) are identical in performance to rising chirps (FIGS. 5A and 5C, respectively).

| Quality parameters | Conventional linear chirp | Chirp with two breaks |
|---|---|---|
| 3 dB resolution | $1.30 \times 10^{-8}$ s | $1.34 \times 10^{-8}$ s (+3%) |
| PSLR | −43.7 dB | −37.1 dB |
| ISLR | −19.8 dB | −19.1 dB |

PSLR and ISLR are quality criteria for an impulse response that are well known to the person skilled in the art: PSLR is an acronym for "peak side lobe ratio", i.e. the maximum level of side lobes relative to the main lobe; and ISLR stands for "integrated side lobe ratio", or the energy contained in the side lobes compared with the energy contained in the main lobe.

The following table gives the theoretical reduction in range ambiguity of orders 1, 2, and 3 on either side:

| Ambiguities −1 and 3 | Ambiguities −2 and 2 | Ambiguities −3 and 1 |
|---|---|---|
| −27.0 dB | −10.0 dB | −27.6 dB |

A chirp having two breaks can be replaced by a waveform having the same segments but interconnected by portions of parabolas (see FIGS. 9A, 9B, 9C, and 9D).

FIG. 6 is a diagram and flow chart showing the main steps in an implementation of the method of the invention.

In a first step 1, a train of pulses $S_0, S_1, S_2, S_3, S_0, S_1, S_2, \ldots$ is generated, e.g. by means of a digital pulse generator. These pulses $S_0, S_1, S_2, S_3$ have different chirps, such as those shown in FIGS. 5A, 5B, 5C, and 5D; or 9A, 9B, 9C, and 9D; or 10A, 10B, 10C, and 10D, for example. The pulse train is amplified to an appropriate power level to form a transmission signal ST which is transmitted by the transmit/receive antenna 101. The waveforms constituting the successive pulses $S_0, S_1, S_2, S_3$ are used to construct matched replicas $R_0, R_1, R_2, R_3$ (reference R in the figure) corresponding to $S_0, S_1, S_2, S_3$ respectively, which replicas are then weighted to supply matched and weighted replicas $RW_0, RW_1, RW_2, RW_3$ (referenced RW in the figure). The waveform of the weighted replica $RW_0$ is indeed the weighted complex conjugate of the pulse $S_0$. It is not a matched replica for the other pulses:

$$\int_{-\infty}^{\infty} R_0(\tau)S_0(\tau)d\tau = \int_{-\infty}^{\infty} S_0^*(\tau)S_0(\tau)d\tau = 1$$

for t=0, and without amplitude weighting.

In a third step 3, the signal SR received from the transmit/receive antenna 101 is subjected to matched filtering for range compression. For a given transmitted pulse, e.g. $S_0$, the received signal SR comprises a main radar echo $s_0$ together with ambiguous echoes $\Sigma_i S_i$ coming from the other pulses in the pulse train ST:

$$SR = s_0 + \Sigma_i S_i$$

The matched filtering 3 is obtained by a correlation operation between the received signal and the replica $RW_0$ matched to $S_0$, to give a filtered signal $FRWS_0$.

$$FRWS_0(\tau) = \int_{-\infty}^{\infty} SR(t)RW_0(t-\tau)dt$$

Figure 7:
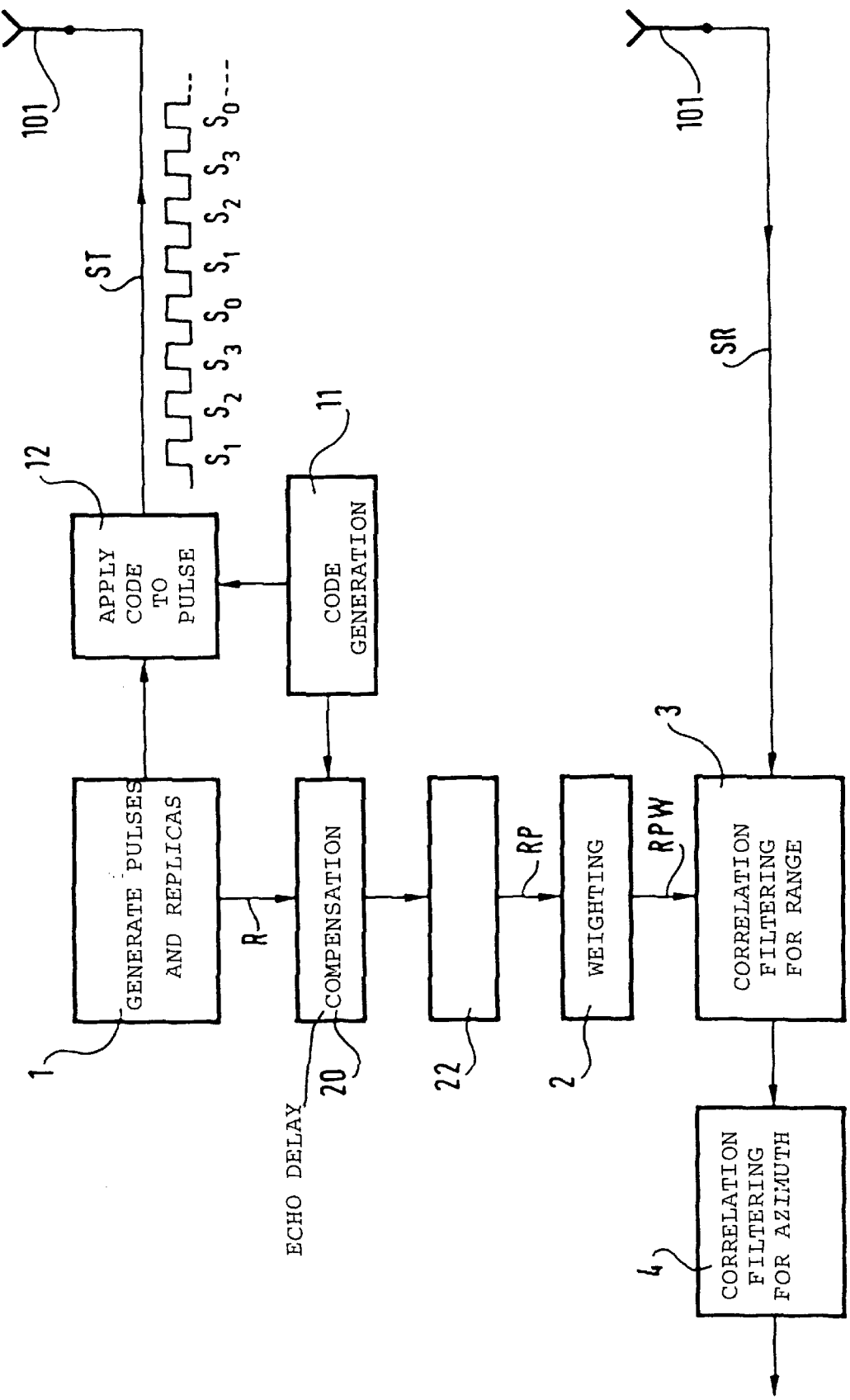
FIG. 7 is a diagram and flow chart showing the main steps in an advantageous variant of the method of the invention that also includes defocusing of ambiguities on the azimuth axis, by encoding the initial phase of successive pulses.

FIG. 7 is a diagram and flow chart showing the main steps in a variant of the method of the invention that includes ambiguity defocusing on the azimuth axis by encoding the initial phase of each successive pulse. The implementation of the method shown in FIG. 7 has the same matched filtering steps 1, 2, 3 for range compression, associated with a few steps specific to matched filtering for azimuth compression.

In the method of FIG. 7, after generating waveforms at 1, there is also code generation at 11, e.g. in the form of a sequence of initial phases to apply to successive pulses, or else of a code sequence for center frequency which varies between successive pulses.

The code generated in this way is applied to the waveforms in step 12 prior to amplification and transmission of the train of pulses $S_0, S_1, S_2, S_3, S_0, \ldots$ making up the signal ST transmitted via the transmit/receive antenna 101.

Initial phase or center frequency encoding analogous to that of step 12 is offset by n ambiguity orders in step 20 so as to allow for the go-and-return travel time of the echo, thus ensuring that the code sequences of the replicas corresponds to the code sequences of the echoes. The code sequence is applied with opposite sign to the replicas $R_0, R_1, R_2, R_3, R_0, \ldots$ as delivered by the generator 1 so as to give replicas RP that are matched and encoded (encoded in initial phase or in center frequency).

As in the method of FIG. 6, the signal RP is weighted in step 2 so as to provide a replica RPW that is matched, encoded, and weighted.

As in the method of FIG. 6, the signal SR received from the transmit/receive antenna 101 is subjected to the filtering step that is adapted to perform range compression by means of a correlation operation 3 on the signal RPW. This correlation operation 3 will give good range compression of the main echo, e.g. $s_0$, providing the replica is $R_0$, since their codes correspond and cancel in step 3 (initial phase $\psi_0$ or center frequency $f+\Delta f_0$ for the echo, initial phase $-\psi_0$ or center frequency $f-\Delta f_0$ for the replica), and will give poor range compression on ambiguous echoes, e.g. $s_{i\neq 0}$.

The signal correlated in this way for range compression is then subjected to a final filtering step 4 which is adapted to perform azimuth compression by a second correlation operation 4 which has the result of spreading ambiguous azimuth chirps with poor azimuth compression for ambiguous echoes, e.g. $s_{i\neq 0}$.

Figure 8:
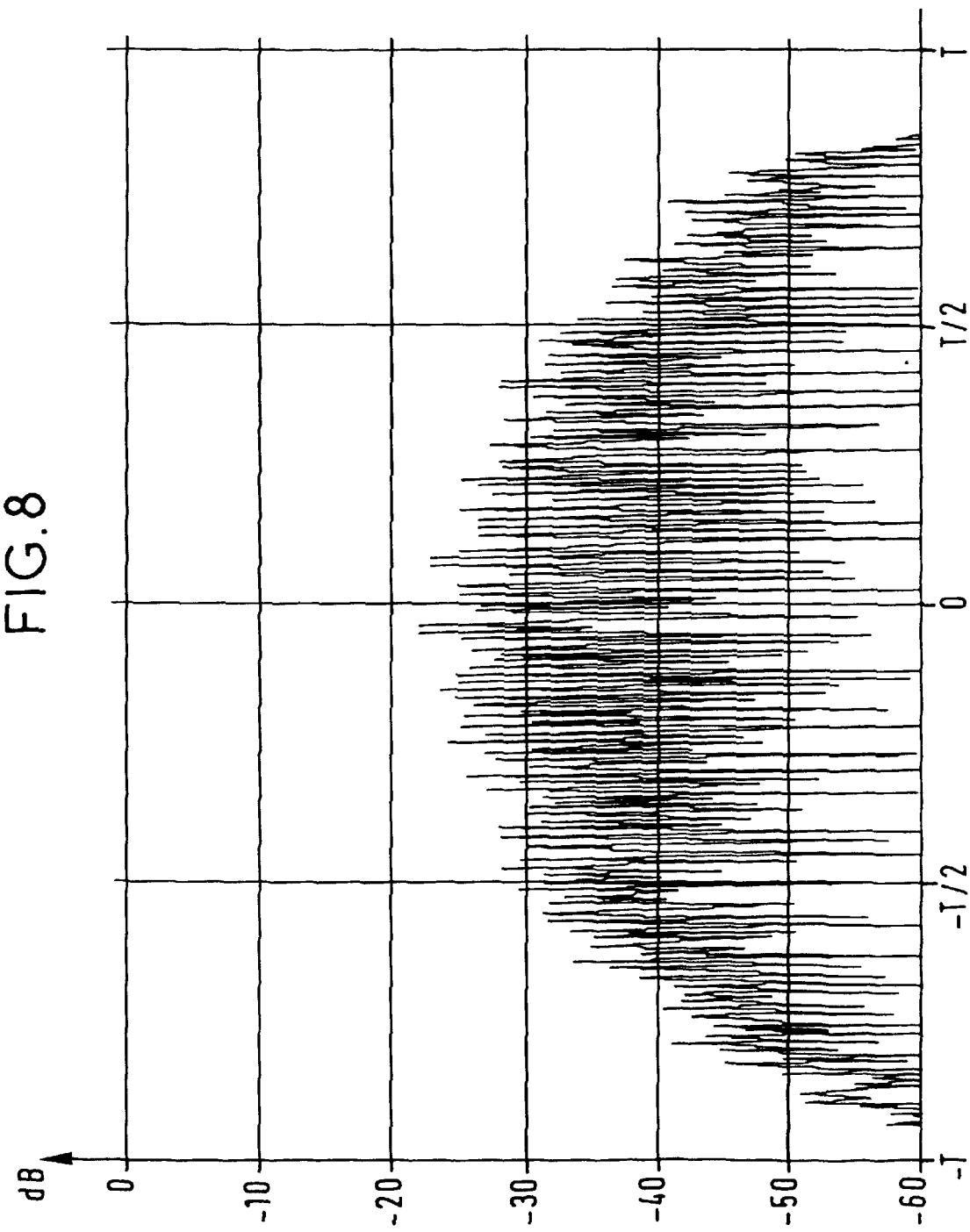
FIG. 8 is a diagram showing one result of a method of the invention, namely the correlation between the azimuth replica and an ambiguous chirp that is not decoded on reception, using random encoding of the initial phase on a pulse-by-pulse basis.

FIG. 8 is a diagram of an example of a result obtained with a method of the invention, namely correlation of the azimuth replica with an ambiguous azimuth chirp that is not decoded on reception, using random encoding of the initial phase on a pulse-by-pulse basis, as explained with reference to FIG. 7. The encoding used in FIG. 8 is a random phase of 0 or $\pi$ applied over a code length of 1000 words.

Naturally, the level of ambiguity reduction depends on the type of encoding used and on the azimuth compression gain. The length of the phase code must be greater than the maximum order of ambiguity that is to be defocused. In general, the longer the code the greater its effectiveness. As shown in FIG. 8, $(0, \pi)$ random phase encoding on the azimuth chirp over a period of 1000 pulses, i.e. a code of 1000 words, reduces ambiguities by about 20 dB compared with the self-correlation of a linear azimuth chirp. In contrast, a 10-word code repeated 1000 times gives a reduction of only $-10$ dB and only the first nine ambiguities are reduced on either side.

Other forms of encoding may have equivalent effectiveness, e.g. $\pi/N$ encoding, or pseudo-random encoding shared between 0 and $2\pi$. Encoding is also selected at a function of the capacity of the digital pulse generator of the radar. Another possible form of encoding consists in varying the center frequency of the pulse band using a pseudo-random sequence instead of varying the initial phase of each pulse.

FIGS. 9A, 9B, 9C, and 9D show another example of a series of waveforms that can be used for defocusing ambiguities on the range axis, in another variant of the method of the invention. FIGS. 9A and 9B are identical to FIGS. 4A and 4B which show linear rising and falling chirps CM and CD respectively in the frequency/time plane. FIGS. 9C and 9D show rising and falling chirps CM2 and CD2 respectively which have waveforms that oscillate around the linear chirps in application of a polynomial rule.

FIGS. 10A, 10B, 10C, and 10D show another series of waveforms for successive pulses that can be used in another variant of the method of the invention. The first three waveforms CM, CD, and CM1 are identical to those of FIGS. 5A, 5B, and 5C. The waveform CD3 of FIG. 10A is antisymmetrical relative to the waveform CM1 of FIG. 10C.

The parameters of bandwidth $B_2$ and of duration $T_2$ for the various slopes of the FIG. 10D chirp having two breaks are not the same as those of the chirp CM1 of FIG. 10C as in the case of FIGS. 5A, 5B, 5C, and 5D. Nevertheless, the results obtained are entirely comparable to that case.

The various variants of the method of the invention make it possible to obtain radar performance improvements in the range 10 dB to 30 dB for reducing higher order ambiguities. Defocusing ambiguities of order 2 and $-2$ on the range axis enables said ambiguities to be reduced by about 10 dB, whereas in the prior art they are maintained in full. Ambiguities of order 1 and order 3 are reduced the same amount in the method of the invention and in the prior art, namely about $-27$ dB.

Defocusing ambiguities on the azimuth axis makes it possible to achieve a reduction of about $-20$ dB for all ambiguities in addition to the reductions acquired by defocusing on the range axis. In particular, this solution can apply to the nadir echo, whatever the PRF of the system.

If both reduction techniques are used for defocusing simultaneously on the range axis and on the defocusing axis, then all of the range ambiguities can theoretically be reduced by about $-30$ dB by combining the advantages of both ways of defocusing.

This improvement in image quality can be made use of to reduce requirements for the antenna radiation pattern (for equivalent performance), i.e. to relax constraints on the steepness of the sides of antenna lobes and the depth of the nadir hole, thereby reducing the complexity, the cost, the mass, and the size of the on-board antenna.

The method of the invention can be used with M different waveforms as a function of the number of ambiguities to be reduced (M−1). The M waveforms may be rising or falling.

The invention also makes it possible to reduce possible jamming by transmitting false echoes, thus making the SAR of the invention more robust in the face of electronic countermeasures.

Naturally, without going beyond the ambit of the invention, the person skilled in the art will easily be able to devise variants of the method of the invention other than those described in detail herein by way of non-limiting example.

We claim:

1. A method of defocusing range ambiguities in a pulse synthetic aperture radar (SAR), the method comprising the following steps:

spreading radar pulses on transmission by using a plurality of "chirp" rules for varying the frequency of the transmitted wave as a function of time, said plurality of chirp rules including a non-linear chirp rule comprising a non-linear frequency variation of the transmitted wave of a pulse as a function of time;

during transmission of successive pulses, alternating chirp rules between chirps that rise and chirps that fall in the frequency/time plane of the pulse; and compressing received echoes by matched filtering using a correlation operation between the received echo signal and the chirp rule that was applied at the time of transmission of the pulse that gave rise to said echo signal, said method being characterized in that said plurality of rules for varying the frequency of the transmitted wave as a function of time comprise a number M of said rules, with M being an integer greater than or equal to 3.

2. A method according to claim 1, having an even number M=2N chirp rules, where N is integer and greater than 1.

3. A method according to claim 2, having N rising chirp rules and N falling chirp rules, characterized in that for each rising chirp rule there exists a corresponding falling chirp rule, said corresponding pairs of rules being mutually symmetrical in shape in the frequency/time plane.

4. A method according to claim 3, having two linear chirp rules, one rising (CM) and the other falling (CD), wherein said non-linear chirp rule comprises a plurality of different frequency slopes within the chirp applied to a pulse, with connections between slopes that are continuous in frequency and phase.

5. A method according to claim 4, characterized in that said plurality of different frequency slopes is equal to at least three, and in that said plurality of different frequency slopes oscillates about a slope of a corresponding linear chirp.

6. A method according to claim 5, characterized in that said plurality of different frequency slopes is smoothed by one of: a polynomial and a differentiable curve.

7. A method according to claim 1, further comprising the following steps:
encoding an initial phase of each pulse on transmission in application of a given sequence of initial phases for the transmission of successive pulses;
applying the same sequence of initial phases to replicas of each pulse; and
performing said matched filtering using the replicas having said sequence of initial phases so as to defocus azimuth ambiguities.

8. A method according to claim 1, further comprising the following steps:
encoding a center frequency of each pulse on transmission in application of a given sequence of frequencies for transmission of successive pulses;
applying the same sequence of frequencies to replicas of each pulse; and
performing said matched filtering using the replicas having said sequence of frequencies so as to defocus azimuth ambiguities.

9. A synthetic aperture radar (SAR), comprising:
means for spreading radar pulses on transmission by using a plurality of "chirp" rules for varying the frequency of the transmitted wave as a function of time;
means for alternating chirp rules during transmission of successive pulses, between chirps that rise and chirps that fall in the frequency/time plane of the pulse, said plurality of chirp rules including a non-linear chirp rule comprising a non-linear frequency variation of the transmitted wave of a pulse as a function of time;
means for compressing received echoes by matched filtering using a correlation operation between the received echo signal and the chirp rule that was applied at the time of transmission of the pulse that gave rise to said echo signal,
said SAR being characterized in that said plurality of rules for varying the frequency of the transmitted wave as a function of time comprise a number M of said rules, with M being an integer greater-than or equal to 3.

10. The method according to claim 1, wherein said plurality of chirp rules includes a linear chirp rule, said non-linear chirp rule and said linear chirp rule being applied to pulses of a same pulse duration T and varying in frequency by a same amount B over the pulse duration T.

11. The method according to claim 1, wherein said spreading step includes transmitting a sequence of non-overlapping pulses, wherein each of said M chirp rules is applied in a cyclic sequence to single ones of said non-overlapping pulses, such that all of said M chirp rules are applied to pulse transmission at mutually exclusive times.

12. The SAR according to claim 9, wherein said non-linear chirp rule comprises a plurality of different frequency slopes within the chirp of said pulse, connections between the different frequency slopes being continuous in frequency and phase.

13. The SAR according to claim 12, wherein said plurality of different frequency slopes is equal to at least three, and wherein said plurality of different frequency slopes oscillates about a slope of a corresponding linear chirp.

14. The SAR according to claim 13, wherein said plurality of different frequency slopes is smoothed by one of: a polynomial and a differentiable curve.

15. The SAR according to claim 9, wherein said plurality of chirp rules includes a linear chirp rule, said non-linear chirp rule and said linear chirp rule being applied to pulses of a same pulse duration T and varying in frequency by a same amount B over the pulse duration T.

16. The SAR according to claim 9, wherein said means for spreading transmits a sequence of non-overlapping pulses, wherein each of said M chirp rules is applied in a cyclic sequence to single ones of said non-overlapping pulses, such that all of said M chirp rules are applied to pulse transmission at mutually exclusive times.

* * * * *